No. 784,072. PATENTED MAR. 7, 1905.
J. L. ROBERTS.
BEE FEEDER.
APPLICATION FILED DEC. 8, 1904.

Witnesses

James L. Roberts, Inventor

No. 784,072.  
Patented March 7, 1905.

UNITED STATES PATENT OFFICE.

JAMES LESLIE ROBERTS, OF WINFIELD, MISSOURI.

BEE-FEEDER.

SPECIFICATION forming part of Letters Patent No. 784,072, dated March 7, 1905.

Application filed December 8, 1904. Serial No. 235,982.

*To all whom it may concern:*

Be it known that I, JAMES LESLIE ROBERTS, a citizen of the United States, residing at Winfield, in the county of Lincoln and State of Missouri, have invented a new and useful Bee-Feeder, of which the following is a specification.

This invention relates to devices of that class employed for feeding syrup and similar materials to bees.

The principal object of the invention is to provide a novel form of feeder in which the danger of drowning of the bees will be reduced to a minimum and, further, to provide a device of this character in which the syrup will be conveniently accessible whether applied in large or small quantities.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
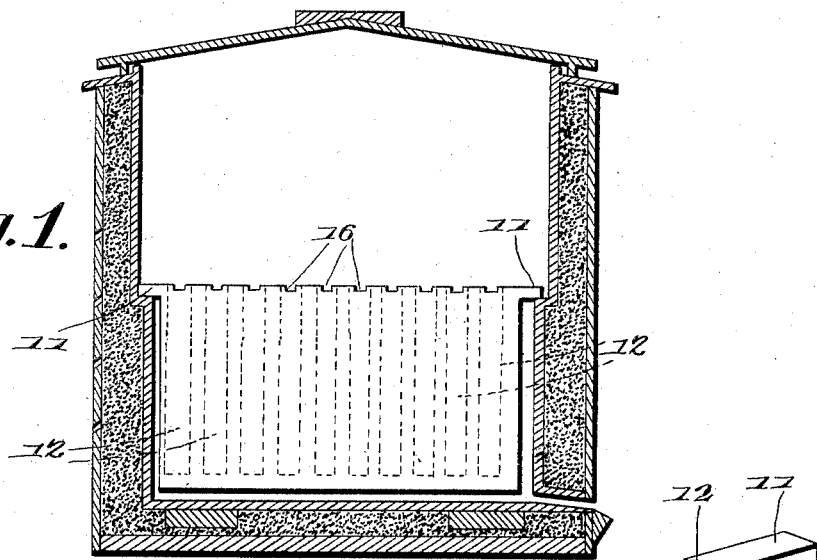
Figure 2:
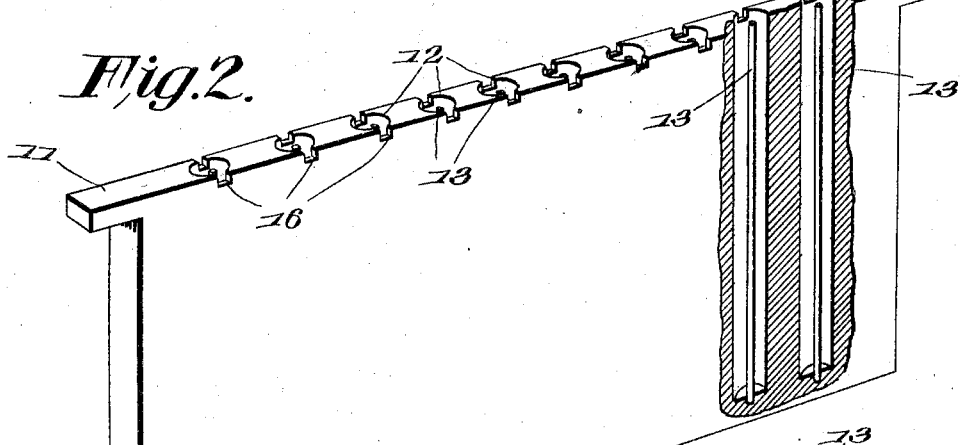
Figure 3:
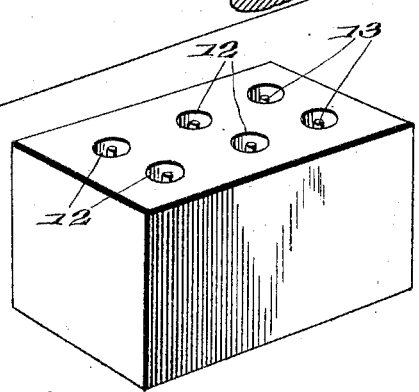

In the accompanying drawings, Figure 1 is a transverse sectional elevation of a portion of a beehive, illustrating a construction and arrangement of feeder embodying the features of the invention. Fig. 2 is a detail perspective view of the feeder removed, parts being broken away in order to more clearly illustrate the construction. Fig. 3 is a similar view of a modification of the invention.

Similar numerals of reference are employed to indicate corresponding parts throughout the several figures of the drawings.

Bee-feeders of the magazine, siphon, and other types are commonly used both in brooders and supers, and in those of the reservoir type the syrup will often fail to attract the bees when the supply is low, owing to its distance from the top of the reservoir, and, aside from this, there is danger of drowning when the bees fall into the syrup.

In carrying out the present invention I provide a feeder which may be placed in the brooder or in the super, the feeder being of such construction that the syrup will be readily accessible whether a large or small quantity is fed.

In the construction shown in Figs. 1 and 2 the feeder is in the form of a slab or strip of wood or similar material having the same general contour as that of one of the ordinary frames and being provided with projecting lugs 11 at its opposite ends in order that it may take the place of one of the frames of the brooder. In this slab or strip are bored or otherwise formed a number of openings 12, into which the syrup is poured, the number of openings filled depending, of course, on the quantity to be fed. In each of the openings is a vertically-disposed rod 13 that extends from top to bottom of said opening and preferably in the center of the same, the rod being arranged at the center of the opening, so that each of the syrup-reservoirs is annular in form and of such width that no matter where a bee may fall into the syrup he is immediately within reach of either the wall of the opening or the surface of the rod and can immediately crawl out without danger of drowning. At the top of each of the reservoirs or openings is a beeway 16 to permit the convenient passage of the bees when a cloth or other cover is in position over the brooder, and these are of the utmost importance in that they really direct the bees to the syrup.

In some cases, especially where feeding in a super, the feeder may be in the form of a block having a large number of openings, each provided with a central rod, as shown in Fig. 3.

In the majority of feeders that are employed to take the place of one of the frames of the brooder it is difficult for the bees to gain access to the syrup where only a small quantity is fed or as the supply is gradually consumed; but in the present case no matter how small the quantity it is always accessible, inasmuch as only one or two or three of the openings may be filled, and these will be filled to the top, so as to immediately attract bees. When but a small quantity is fed in the ordinary feeder, it is placed at the bottom and is not so likely to attract the bees.

Having thus described the invention, what is claimed is—

1. In a bee-feeder, a casing having a plurality of reservoirs, each provided with a centrally-disposed rod or standard extending to the top of said reservoir.

2. In a bee-feeder, a slab or plank having end lugs or flanges, and provided with a plurality of independent reservoirs, the material at the top of the plank or board being removed to form beeways at the tops of the reservoirs, and a centrally-disposed rod or standard arranged within each reservoir and extending to the top thereof.

In testimony that I claim the foregoing as my own I have hereto affixed my signature in the presence of two witnesses.

JAMES LESLIE ROBERTS.

Witnesses:
C. A. ADMIRE,
LEWIS ADMIRE.